F. M. JONES.
DOUGH MIXING MACHINE.
APPLICATION FILED AUG. 29, 1919.

1,335,737.

Patented Apr. 6, 1920.
2 SHEETS—SHEET 1.

Inventor:
Frank M. Jones;
BY
Bryant Pinkney,
His Attorney.

F. M. JONES.
DOUGH MIXING MACHINE.
APPLICATION FILED AUG. 29, 1919.

1,335,737.

Patented Apr. 6, 1920.
2 SHEETS—SHEET 2.

Inventor:
Frank M. Jones;
BY
Bryant D. Pinkney,
His Attorney.

UNITED STATES PATENT OFFICE.

FRANK M. JONES, OF BOSTON, MASSACHUSETTS.

DOUGH-MIXING MACHINE.

1,335,737.  Specification of Letters Patent.  Patented Apr. 6, 1920.

Application filed August 29, 1919. Serial No. 320,680.

*To all whom it may concern:*

Be it known that I, FRANK M. JONES, a citizen of the United States, residing at Boston, in the county of Suffolk and State of Massachusetts, have invented certain new and useful Improvements in Dough-Mixing Machines, of which the following is a specification.

My invention relates to improvements in machines for the mixing and the kneading of dough, and similar masses of a doughy or plastic nature in which a single mixing agitator is employed; and the objects of my improvements are, first, to subject the contents to a thorough and uniform mixing, causing the dry and liquid ingredients to become correctly blended and mixed, and then to assume the form of a partially cohesive mass; and second, by the continued action of the agitator, to so completely knead and stretch the dough or plastic mass by means of the novel motion due to the obliquity of the axis of the oval-shaped agitator, that plenty of air is worked in and the desired chemical action soon results, causing the gluten to be fully developed and the mass to prove well and make a finer grained, whiter, and larger loaf for the weight.

I attain these objects by the mechanism illustrated in the accompanying drawings, in which—

Figure 1:
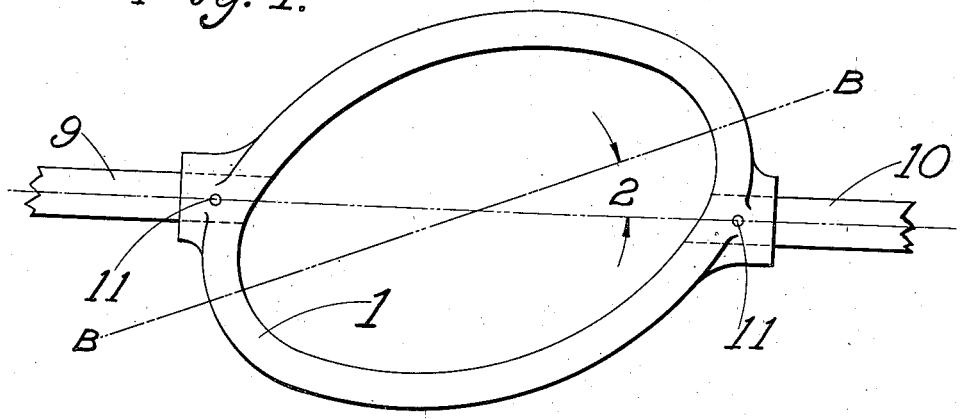
Figure 2:
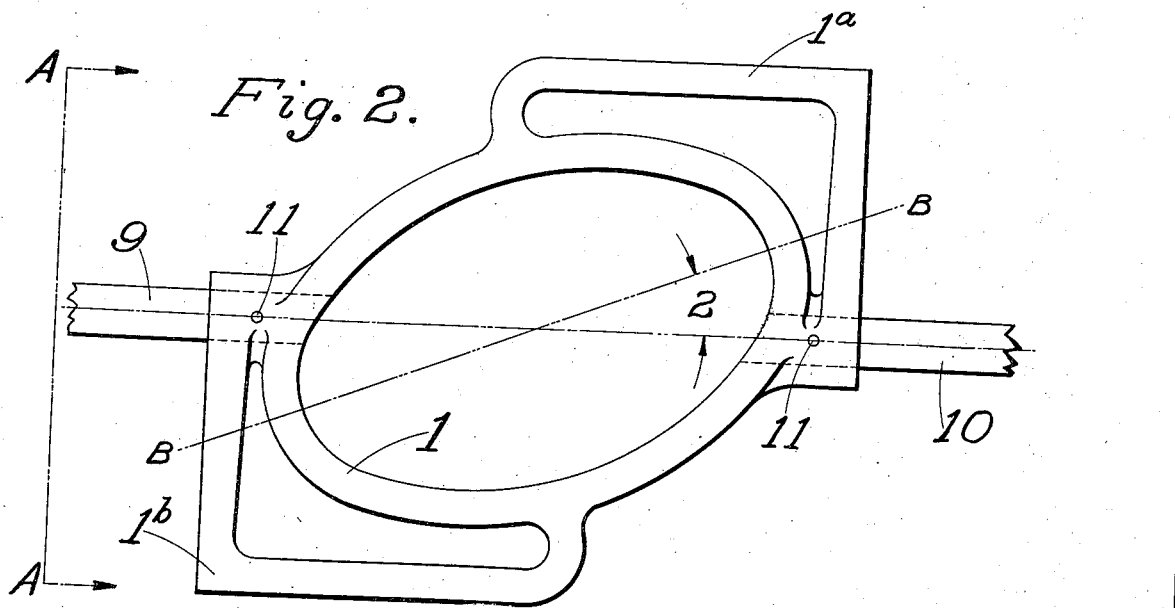
Figure 3:
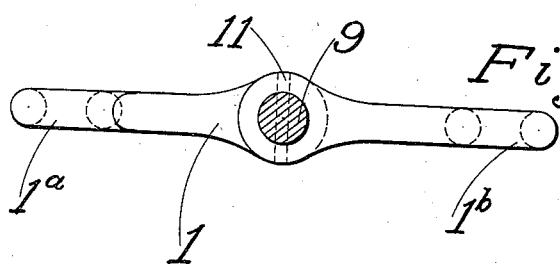
Figure 4:
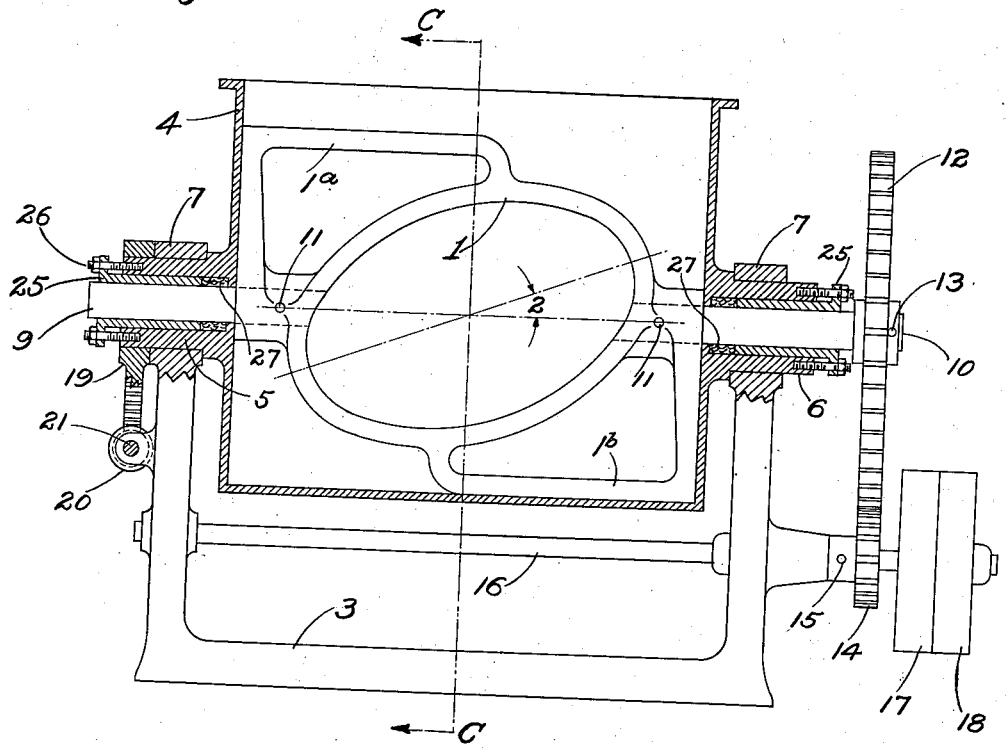
Figure 5:
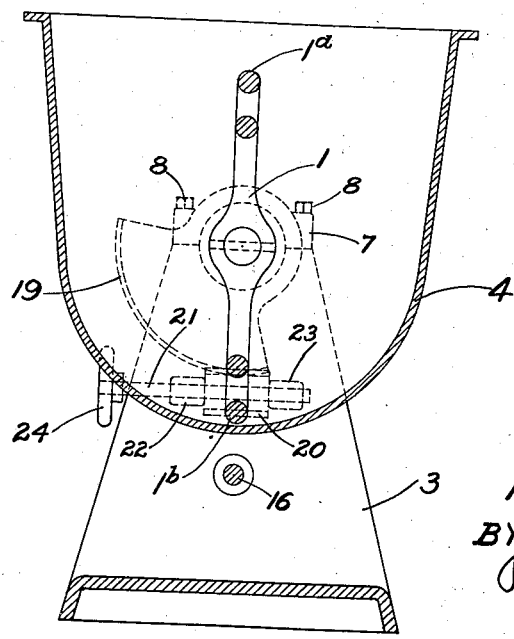

Figure 1 shows my improved agitator; Fig. 2, my improved agitator with oppositely-disposed wings to serve as scrapers for sticky substances; Fig. 3, an end view of the agitator shown in Fig. 2, looking in the direction of the arrows at line A—A; Fig. 4, a front elevation of my improved dough mixing machine, partially cross-sectioned, showing the oval-shaped oblique agitator in position, with the oppositely-disposed wings 1ª and 1ᵇ shown at opposite ends to that shown in Fig. 2; Fig. 5, a transverse cross-section taken at line C—C, Fig. 4.

Similar numerals refer to similar parts throughout the several views.

Referring to the drawings, the agitator 1 is constructed in the form of an oval with the major axis B—B at an obliquity 2 with the axis of rotation. For sweet doughs (such as are used for cakes and cookies), and hard doughs (such as are used for crackers and macaroni), a scraper member is not essential; but for bread doughs it is preferable to provide oppositely-disposed wings 1ª and 1ᵇ, Fig. 2, to work in close proximity with the curved wall of a mixing receptacle, described later, for scraping purposes. It is immaterial what relation these oppositely-disposed wings 1ª and 1ᵇ bear in reference to the oval, whether at the high ends of the oval as shown in Fig. 2, or at the low ends of the oval as shown at Fig. 3. The agitator 1 is mounted on shafts 9, 10, rigidly secured thereto by suitable means, such as by pins 11, and rotatably mounted in the trunnions 5 and 6 of the mixing receptacle 4. The trunnions 5 and 6 are mounted in frame 3 and caps 7. Capscrews 8 are shown as means to fasten caps 7 to the frame 3. On trunnion 5 is secured a chordal wormwheel 19, or other suitable means, by which the tilting of the mixing receptacle 4 is effected, for emptying the mixed batch into a trough or other receptacle. I have shown a worm 20, secured to a shaft 21 suitably mounted in lugs 22 and 23 of frame 3, as meshing with the chordal wormwheel 19, to be operated by power or by manual means by means of a hand-wheel 24.

The agitator 1, described above, is rotatably mounted in the trunnions 5 and 6 of the mixing receptacle 3, and rotated in any suitable manner, such as for example, through the medium of gear 12 and pinion 14, and actuated by a drive shaft 16, on which are provided tight and loose pulleys 17 and 18, or any other suitable means, through which motive power may be applied to the mixer. Drive gear 12 is rigidly fastened to agitator shaft 10 by suitable means, such as a pin 13. Pinion 14 is rigidly fastened to drive shaft 16 by suitable means, such as a pin 15.

It is essential that the mixing receptacle 4 be watertight, so that leakage of liquids can not take place. To this accomplishment, the agitator shafts 9 and 10 rotate in suitable stuffing-boxes 25, mounted in trunnions 5 and 6, provided with adjustment screws 26 for taking up wear, and fibrous packings 27.

The operation of my improved dough mixing machine is as follows: The ingredients to be mixed (usually for bread doughs, which comprise flour, salt, sugar, lard, yeast and water) are placed in mixing receptacle 4 either just before the dough mixing machine is operated, or while it is being operated.

The ingredients generally are such that must first be blended (which blending takes place in the mixing process before the ingredients assume the form of a cohesive mass), and then kneaded and stretched. On account of the end-thrust action while rotating, due to the novel construction of the oval, the unmixed portion of the ingredients is worked back and forth until it is of sufficient consistency that it will yield to the kneading and stretching action of the agitator, the stretching action taking place due to the obliquity of the rotation of the oval in reference to the axis of rotation, and the resistance of the curved inner surface of the mixing receptacle 4, which surface is parallel to the axis of rotation. This process produces the desired chemical action and develops the gluten, and makes a dough of maximum strength in a minimum of time, and at a comparatively low temperature.

Having thus described my invention, what I claim as new and desire to secure by Letters Patent, is—

1. In a dough mixing machine, the combination comprising a receptacle and an agitator therefor; said agitator being in the form of an oval with an axis of rotation at an obliquity with the axis of the oval, said oval having its greatest width midway of its length.

2. In a dough mixing machine, the combination comprising a receptacle, an agitator therefor, and driving means for imparting rotary motion to the agitator; said agitator being in the form of an oval with an axis of rotation at an obliquity with the axis of the oval; and oppositely-disposed wings integral with said oval to travel in close proximity to the curved wall of the receptacle and scrape the ends of said receptacle, substantially as described.

In testimony whereof I affix my signature.

FRANK M. JONES.